Figure 1:
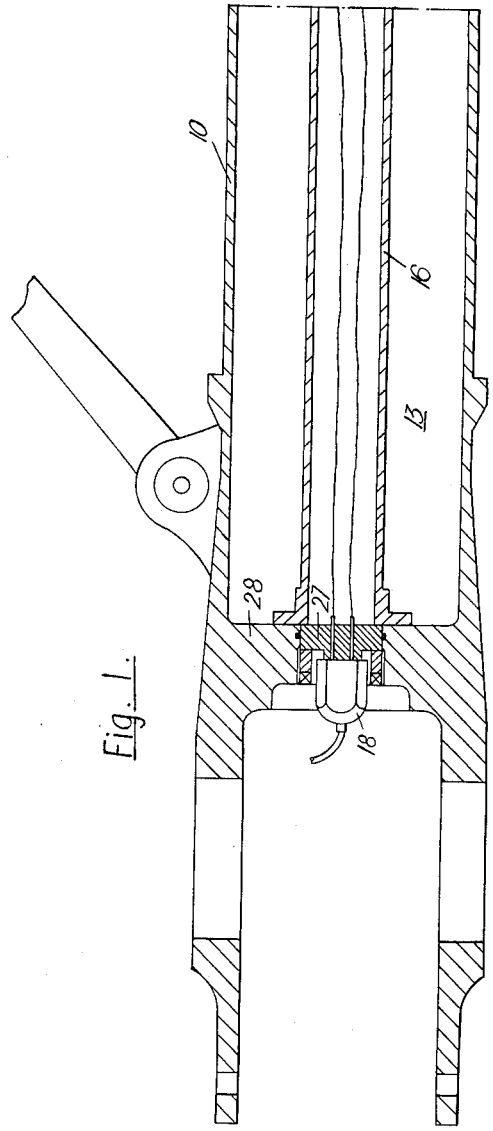

Oct. 26, 1965 R. UTTING 3,214,116
SHOCK ABSORBER FOR AIRCRAFT UNDERCARRIAGE
Filed March 30, 1964 2 Sheets-Sheet 2

Inventor
REGINALD UTTING
By Bailey, Stephens &
Huettig
Attorneys

United States Patent Office 3,214,116
Patented Oct. 26, 1965

3,214,116
SHOCK ABSORBER FOR AIRCRAFT
UNDERCARRIAGE
Reginald Utting, Bristol, England, assignor to British Aircraft Corporation (Operating) Limited, London, England, a British company
Filed Mar. 30, 1964, Ser. No. 355,796
Claims priority, application Great Britain, Apr. 4, 1963, 13,430/63
1 Claim. (Cl. 244—104)

This invention concerns shock absorbers which contain one or more fluids.

According to the present invention such a shock absorber incorporates a heater and a thermostat arranged to control the heater so as to maintain the fluid or fluids at a substantially constant temperature despite considerable variations in the temperature of the surroundings of the shock absorber.

Maintenance of the temperature of the fluid or fluids has the effect of maintaining substantially constant both the viscosity and also the volume per unit mass at any predetermined pressure. In consequence, the load/displacement characteristics of the shock absorber are substantially the same whatever the external temperature. This means that the range of travel provided for in the shock absorber need be no more than the displacement which occurs during the maximum change in load for which the shock absorber is designed.

In contrast, if the temperature of a fluid in a shock absorber is permitted to vary considerably, in accordance with surrounding conditions, it will be found necessary to provide for a range of travel considerably greater than the displacement required for any one loading and unloading, and this displacement will occupy different parts of the range of travel according to the temperature of the fluid. Moreover the magnitude of the displacement will vary with temperature.

If, as is usually the case, the shock absorber includes coaxial parts arranged for relative reciprocation, the heater is preferably an electric element located along the axis of the parts. If, as is usually the case, the shock absorber contains both a liquid (of the kind known as hydraulic fluid) and a gas (either air or nitrogen), then the heater is preferably placed so that it is surrounded by the liquid, the heat then being transmitted directly to the liquid, and through the liquid to the gas in a space offset from the heater.

The present invention is of particular value when applied to shock absorbers in aircraft undercarriages which experience a very wide range of surrounding temperatures. In particular, in high speed aircraft, the undercarriage structure becomes heated during flight, so that, when the aircraft is landing, the structure is still at a temperature above that of the surrounding atmosphere. Provision is sometimes made for cooling the undercarriage structure continuously while the aircraft is in flight, and this serves to limit the difference in temperature between the undercarriage structure and the surrounding atmosphere when the aircraft is landing, but does not ensure that the temperature of the structure is the same for a series of successive landings under different conditions. Nor does it ensure that the temperature of the structure on take-off is the same as that on landing. To allow for the range of temperatures which the shock absorber may thus be at, when called upon to operate, a considerable range of travel must be provided for, as explained above, and this involves undesirable bulk.

In the application of the present invention to an aircraft undercarriage, the heater and thermostat are so arranged that, on all occasions when the shock absorber is required to operate, it is at substantially the same temperature. This temperature is about equal to the highest temperature at which the shock absorber would be called upon to operate in the absence of any heater.

The accompanying drawings show one example of a shock absorber according to the present invention.

Figure 2:
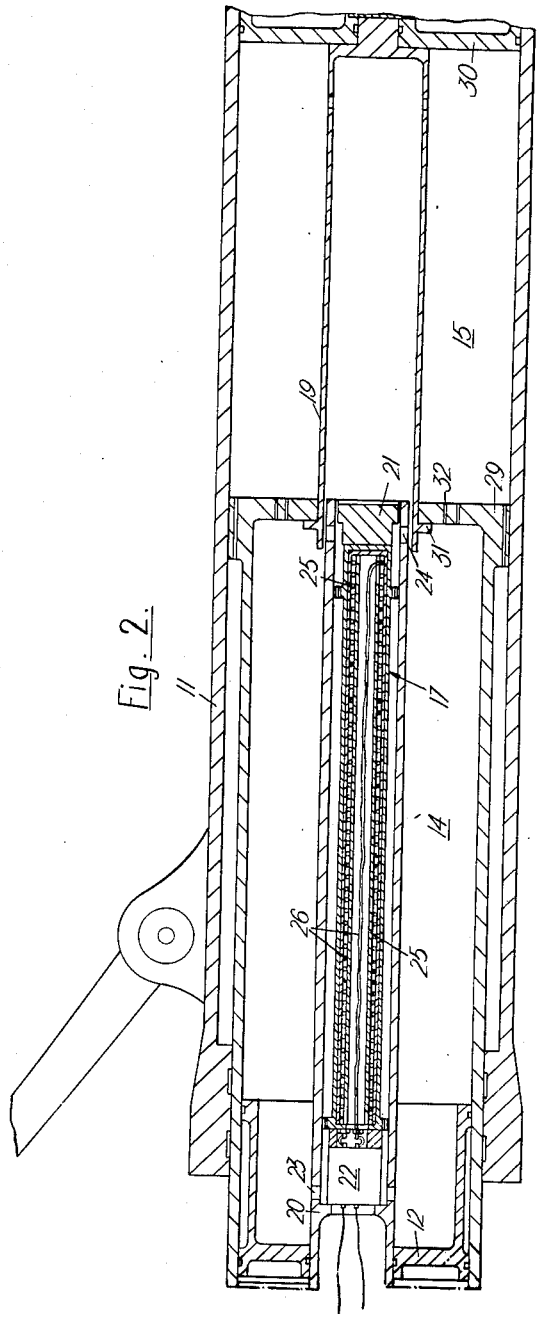

FIGURES 1 and 2 are two parts of a longitudinal section through the shock absorber.

This shock absorber is intended to be incorporated in an aircraft undercarriage. It consists of two relatively reciprocable cylinders 10 and 11, telescoping one within the other. Within the cylinder 10 there is a freely slidable piston 12 serving to separate a chamber 13 containing air or nitrogen from a chamber 14 containing oil. The cylinder 10 is closed at the left hand end by a wall 28, and at the right hand end it has a wall 29 in which are narrow passages 32 permitting restricted flow of oil between the chamber 14 and a chamber 15 within the cylinder 11. This chamber 15 also contains oil, and is bounded by a fixed right hand wall 30.

When a force to the right is applied to the cylinder 10, the air on nitrogen in the chamber 13 acts as a resisting spring, and the oil passing through the passages 32 between the chambers 15 and 14 acts as a dashpot.

Expansion of the shock absorber is limited by a flange 31 on a tube 19 which is fixed to the wall 30.

The heater is in the form of a tubular electric element 17, consisting of a porcelain former 25 around which is wound a coil of resistance wire 26. This element is housed within a tubular member 16 attached to the left hand wall 28 of the cylinder 10. The heater element 17 is electrically connected to a thermostat 22, and the assembly of heater element 17 and thermostat 22 is located between a shoulder 20 and an end plug 21. Electric leads pass from the thermostat 22 to a connection 18 in an end plug 27 at the left hand end of the tubular member 16.

Oil can reach the interior of the tubular member 16 through openings 23 and 24, and the thermostat 22 is placed so as to be in the flow of oil passing through the holes 23.

When an aircraft is to be prepared for take-off, the connection from the plug 18 is taken to an external electrical supply. Operation of the heater for about half an hour will bring the shock absorber to operating temperature. The electrical connection is then transferred to the electrical system of the aircraft itself. Alternatively, if the aircraft itself contains an electric generator which can be operated while the main engines are at rest, then, for preparation for take-off, the heater may be supplied from that generator.

A suitable temperature for setting the thermostat is 45° C. During high speed flight, exhaust cabin air may be passed to the undercarriage bay so as to keep the temperature down to about 80° C., instead of permitting it to rise to about 130° C., which would occur without cooling. When the undercarriage is lowered, prior to landing, the airflow passing the leg cools the entire undercarriage structure down to about 45° C. If, however, the aircraft has been flying at low speed for some considerable time before landing, then the temperature of the undercarriage structure when it is lowered may be less than 80°, and the cooling effect of the air flow will tend to reduce the temperature to a figure considerably lower than 45°. It is then that the thermostat brings the heater into operation to ensure that, no matter what the flight conditions have been prior to landing, the shock absorber will be at substantially 45° when landing occurs. The heater also, as already explained, serves to ensure that on take-off the shock absorber is also at substantially 45°.

I claim:

An aircraft having an undercarriage with a shock absorber comprising two members which are associated for relative telescopic movement, and which together define a chamber the volume of which varies with the movement, a compressible gas within the chamber, means within the chamber for transferring heat to the gas, means for supplying energy to the heating means, and means, responsive to the temperature of the gas, for automatically interrupting the supply of energy whenever the temperature of the gas exceeds a predetermined value, whereby to maintain said gas at a substantially constant temperature despite variations in the temperature of the surroundings of the shock absorber.

References Cited by the Examiner

UNITED STATES PATENTS

| | | | |
|---|---|---|---|
| 2,180,893 | 11/39 | Best | 188—100 |
| 2,800,320 | 7/57 | Jarret et al. | 188—100 |
| 3,067,841 | 12/62 | Kendall | 267—64 |

FERGUS S. MIDDLETON, *Primary Examiner.*

MILTON BUCHLER, *Examiner.*